(12) United States Patent
Shikimachi et al.

(10) Patent No.: US 8,180,564 B2
(45) Date of Patent: May 15, 2012

(54) DATA PROCESSING APPARATUS

(75) Inventors: Takeshi Shikimachi, Kariya (JP);
Osamu Kanematsu, Nagoya (JP)

(73) Assignee: DENSO CORPORATION, Kariya (JP)

( * ) Notice: Subject to any disclaimer, the term of this patent is extended or adjusted under 35 U.S.C. 154(b) by 407 days.

(21) Appl. No.: 12/588,420

(22) Filed: Oct. 15, 2009

(65) Prior Publication Data

US 2010/0106412 A1 Apr. 29, 2010

(30) Foreign Application Priority Data

Oct. 24, 2008 (JP) ................................. 2008-274610

(51) Int. Cl.
*G01C 21/00* (2006.01)
*G08G 1/0969* (2006.01)

(52) U.S. Cl. ....................................... 701/410; 701/411

(58) Field of Classification Search .................. 701/410, 701/411, 416, 428, 461
See application file for complete search history.

(56) References Cited

U.S. PATENT DOCUMENTS

| 2008/0120171 | A1 | 5/2008 | Ikeuchi et al. | |
| 2009/0082956 | A1* | 3/2009 | Hamaguchi | 701/207 |
| 2010/0223000 | A1* | 9/2010 | Nakae et al. | 701/201 |

FOREIGN PATENT DOCUMENTS

| JP | A-06-088733 | 3/1994 |
| JP | A-9-243391 | 9/1997 |
| JP | A-2002-054934 | 2/2002 |
| JP | A-2003-130656 | 5/2003 |
| JP | A-2006-220449 | 8/2006 |
| JP | A-2008-196925 | 8/2008 |

OTHER PUBLICATIONS

Office Action mailed Sep. 14, 2010 issued from the Japan Patent Office for corresponding Japanese patent application No. 2008-274610.
Office Action dated Sep. 14, 2010 from the Japan Patent Office in corresponding Japanese Patetnt Application No. 2008-274610 (English translation enclosed).

* cited by examiner

*Primary Examiner* — Tan Q Nguyen
(74) *Attorney, Agent, or Firm* — Posz Law Group, PLC (57) ABSTRACT

With respect to a non-road region route, which is in a region other than roads registered in map data, a navigation apparatus in a vehicle specifies three check items: travel times the vehicle traveled; a shortened distance reduced by traveling the non-road region route compared with a route registered in the map data; and presence or absence of a predetermined facility in the vicinity of the non-road region route. The navigation apparatus determines an accuracy degree as to whether the non-road region route is existent based on the specified check items, thereby determining whether the non-road region route is existent. A route guidance process is executed based on the non-road region route, which is determined to be existent.

2 Claims, 3 Drawing Sheets

NON-ROAD REGION ROUTE DETERMINATION LIST

| ROUTE ID | TRAVEL TIME | SHORTENED D. | FACILITY | D. POINT | |
|---|---|---|---|---|---|
| 1 | 20 | 5 m | YES | 12 | REGISTER |
| 2 | 100 | 10000 m | YES | 100 | REGISTER |
| 3 | 2 | 300 m | NO | 6 | NOT REGISTER |
| 4 | 1 | 0 m | NO | 1 | NOT REGISTER |

FIG. 2B

ACCURACY DEGREE DETERMINATION REFERENCE LIST

| TRAVEL TIME | SHORTENED D. | FACILITY | ACCURACY D. |
|---|---|---|---|
| ≥51 | ≥1000 m | - | 10 |
| 21-50 | 301-999 m | - | 8 |
| 11-20 | 101-300 m | - | 6 |
| 6-10 | 11-100 m | - | 4 |
| 1-5 | 1-10 m | - | 2 |
| - | ≤0 m | YES | 1 |
| - | - | NO | 0.5 |

FIG. 3

DATA PROCESSING APPARATUS

CROSS REFERENCE TO RELATED APPLICATION

The present application is based on and incorporates herein by reference Japanese Patent Application No. 2008-274610 filed on Oct. 24, 2008.

FIELD OF THE INVENTION

The present invention relates to a data processing apparatus such as a navigation apparatus in a vehicle and a portable apparatus for executing a process based on map data.

BACKGROUND OF THE INVENTION

[Patent document 1] JP-H6-88733 A

There is known a navigation apparatus in a subject vehicle to learn a new road not registered in map data based on a travel locus of the subject vehicle. Patent document 1 recites a navigation apparatus to generate route data based on travel locus generated when traveling a region other than roads registered in the map data, thus learning a new road which is not registered in the map data. According to the navigation apparatus in Patent document 1, for instance, if a certain road, which is not registered in the map data, is newly built, the certain road can be learned by a subject vehicle traveling the certain road. Therefore, without need of updating the map data from an outside, it becomes possible to execute a process of a route search covering such a newly built road.

In this regard, however, according to the above-mentioned navigation apparatus in Patent document 1, for example, even if the subject vehicle enters a parking lot etc. from a road registered in the map data, and then moves inside of the parking lot, there is a possibility of learning as a new road the route corresponding to the travel locus inside of the parking lot. In addition, even if a travel locus of the subject vehicle is mistakenly detected as a travel locus in a region other than roads registered in the map data because of measurement errors, there is a possibility of learning the mistakenly detected travel locus as a new road. Thus, the navigation apparatus in Patent document 1 has a possibility to learn as a new road a road which does not exist really.

SUMMARY OF THE INVENTION

The present invention is made so as to address the above technical problem. The present invention relates to a data processing apparatus, which has a learning function about a new road being not registered in map data and executes various processes based on a learned new road like the above-mentioned navigation apparatus. It is an object of the present invention to provide a data processing apparatus which helps prevent an incorrect process from being executed based on an nonexistent road.

According to a first example of the present invention, a data processing apparatus to travel is provided as follows. An acquisition section is configured to acquire map data. A route storage section is configured to store a route in a map indicated by the acquired map data. A travel locus specification section is configured to specify a travel locus, which is generated when traveling, in a map indicated by the acquired map data. A route storage control section is configured to (i) cause the travel locus specification section to specify a non-road region travel locus generated when traveling a non-road region being a region excluding roads included in a map indicated by the acquired map data, and (ii) store in the route storage section a non-road region route, which corresponds to the specified non-road region travel locus. A repetition specification section is configured to specify, based on a travel locus specified by the travel locus specification section, repetition times the non-road region route stored in the route storage section has been traveled. A new road determination section is configured to perform a new road determination, which determines based on the specified repetition times whether the non-road region route is a route indicating a new road being a road, which has not been registered in the map data. A process execution section is configured to execute a predetermined process based on the non-road region route, which is determined to be the route indicating the new road.

The data processing apparatus may be an in-vehicle navigation apparatus, or a portable apparatus such as a cellular phone with a navigation function, for example. In addition, for example, the acquisition section may acquire the map data from a storage media, such as a HDD and DVD-ROM, or may access a public communication network wirelessly and acquire the map data from an external server via the public communication network. In addition, for example, the process execution section may execute a route guidance process or an image display process of a map around a present position of the subject apparatus based on the map data and the non-road region route determined to be a route indicating a new road. In addition, updates may be made to the map data acquired previously or newly by the acquisition section based on the non-road region route determined to be a route indicating a new road.

As explained above, the navigation apparatus is known which has the function to learn a new road, which is not registered in the map data, based on a travel locus generated when the subject vehicle traveled a non-road region, which is a region other than roads included in a map indicated by the map data. When such a navigation apparatus is used, for example, when the subject vehicle runs in a parking lot, or when a travel locus is mistakenly detected in a non-road region, a road, which is not really existent, might be learned as a new road. Accordingly, in order to suitably execute a process based on the learned road, it is necessary to determine whether the learned road is a new road really existent.

It is noted, when the learned road is repeatedly or frequently traveled by the subject apparatus, the possible that the learned road is existent is high. To that end, in the data processing apparatus as the first example, with respect to a non-road region route, which is a route traveled by the subject apparatus in a region excluding roads registered in the map data, repetition times the subject apparatus traveled is specified, and it is determined whether the non-road region route is a new road based on the repetition times specified. A predetermined process such as a route guidance process is executed based on the non-road region route determined to be a new road. This helps prevent a process from being mistakenly executed based on a road which does not exist really.

In addition, for example, by traveling the learned road, a travel distance to reach a predetermined point may be shortened compared with the case when traveling a road registered in the map data. That is, the learned road is a shorter route. Such a road can be said to be highly useful. Therefore, it is highly possible that the learned road is not a route accidentally detected based on the travel locus, but a road which the user of the data processing apparatus intentionally selected as a travel route.

Thus, according to a second example of the present invention, a data processing apparatus to travel is provided as follows. An acquisition section is configured to acquire map data. A route storage section is configured to store a route in a map indicated by the acquired map data. A travel locus specification section is configured to specify a travel locus, which is generated when traveling, in a map indicated by the acquired map data. A route storage control section is configured to (i) cause the travel locus specification section to specify a non-road region travel locus generated when traveling a non-road region being a region excluding roads included in a map indicated by the acquired map data, and (ii) store in the route storage section a non-road region route, which corresponds to the specified non-road region travel locus. A map data route specification section is configured to specify based on the acquired map data a previously existing map data route, which is composed of at least one road included in a map indicated by the acquired map data, the previously existing map data route linking between a start point and an end point of the non-road region route stored in the route storage section. A new road determination section is configured to perform a new road determination, which determines whether the non-road region route is a route indicating a new road being a road, which has not been registered in the map data, based on (i) a non-road region travel distance, which is calculated alongside of the non-road region route stored in the route storage section, from a start point to an end point, and (ii) a map data travel distance, which is calculated alongside of the specified previously existing map data route from a start point to an end point. A process execution section is configured to execute a predetermined process based on the non-road region route, which is determined to be the route indicating the new road.

Thus, based on the travel distance at the time of traveling a non-road region route, etc., the usefulness may be determined. When the usefulness of the non-road region route is high, it is considered that the non-road region route may be a new road. Based on such a non-road region route, a predetermined process can be executed. This helps prevent a process from being mistakenly executed based on a road which does not exist really.

Further, it is noted, when the learned road is a route to a predetermined facility, the possibility that the learned road is existent is high. Thus, according to a third example of the present invention, a data processing apparatus to travel is provided as follows. An acquisition section is configured to acquire map data. A route storage section is configured to store a route in a map indicated by the acquired map data. A travel locus specification section is configured to specify a travel locus, which is generated when traveling, in a map indicated by the acquired map data. A route storage control section is configured to (i) cause the travel locus specification section to specify a non-road region travel locus generated when traveling a non-road region being a region excluding roads included in a map indicated by the acquired map data, and (ii) store in the route storage section a non-road region route, which corresponds to the specified non-road region travel locus. A facility determination section is configured to determine based on the acquired map data a presence or an absence of a predetermined facility in a vicinity of the non-road region route stored in the route storage section. A new road determination section is configured to perform a new road determination, which determines whether the non-road region route is a route indicating a new road being a road, which has not been registered in the map data, based on a determination result about the presence or the absence of the predetermined facility in the vicinity of the non-road region route by the facility determination section. A process execution section is configured to execute a predetermined process based on the non-road region route, which is determined to be the route indicating the new road.

Further, the predetermined facility may be a commercial establishment, amusement facility, etc. Thus, when there is existing a predetermined facility in a vicinity of the non-road region route, the non-road region route is regarded as a route to the predetermined facility to thereby determine that the non-road region route is a new road. Based on the non-road region route determined to be a new road, a predetermined process can be then executed. This helps prevent a process from being mistakenly executed based on a road which does not exist really.

In addition, the data processing apparatus may determine whether the non-road region route is a new road further differently. That is, as a fourth example of the present invention, a data processing apparatus to travel is provided as follows. An acquisition section is configured to acquire map data. A route storage section is configured to store a route in a map indicated by the acquired map data. A travel locus specification section is configured to specify a travel locus, which is generated when traveling, in a map indicated by the acquired map data. A route storage control section is configured to (i) cause the travel locus specification section to specify a non-road region travel locus generated when traveling a non-road region being a region excluding roads included in a map indicated by the acquired map data, and (ii) store in the route storage section a non-road region route, which corresponds to the specified non-road region travel locus. A new road determination section is configured to perform a new road determination, which determines whether the non-road region route stored in the route storage section is a route indicating a new road being a road, which has not been registered in the map data. A process execution section is configured to execute a predetermined process based on the non-road region route, which is determined to be the route indicating the new road. At least two determination information specification sections are included among a first determination information specification section, a second determination information specification section, and a third determination information specification section, each determination information specification section being configured to specify determination information, which is used for performing the new road determination. Herein, the determination information specified by the first determination information specification section includes repetition times the non-road region route stored in the route storage section has been traveled, the repetition times being specified based on a travel locus specified by the travel locus specification section. The determination information specified by the second determination information specification section includes (i) a non-road travel distance, which is calculated alongside of the non-road region route stored in the route storage section from a start point to an end point, and (ii) a map data travel distance, which is calculated alongside of a previously existing map data route that is composed of at least one road included in a map indicated by the acquired map data, the previously existing map data route linking between a start point and an end point of the non-road region route stored in the route storage section. The determination information specified by the third determination information section includes a determination result of determining based on the acquired map data a presence or an absence of a predetermined facility in a vicinity of the non-road region route stored in the route storage section. The new road determination section is further configured to perform the new road determination, with respect to the non-road region route stored in the route storage section, based on the determination information specified by the at least two determination information specification sections.

Thus, a new road determination as to whether the non-road region route is a new road can be made based on several determination information items. Whether the non-road region route is a new road can be determined without inclining towards a specific aspect, thereby enabling an appropriate determination about a new road. This helps prevent a process more certainly from being mistakenly executed based on a road which does not exist really.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

An embodiment according to the present invention will be explained with reference to drawings. In addition, the embodiments of the present invention can be modified in various manners within a technical scope of the present invention without being limited to the following embodiments.

[Explanation of Configuration]

Figure 1:
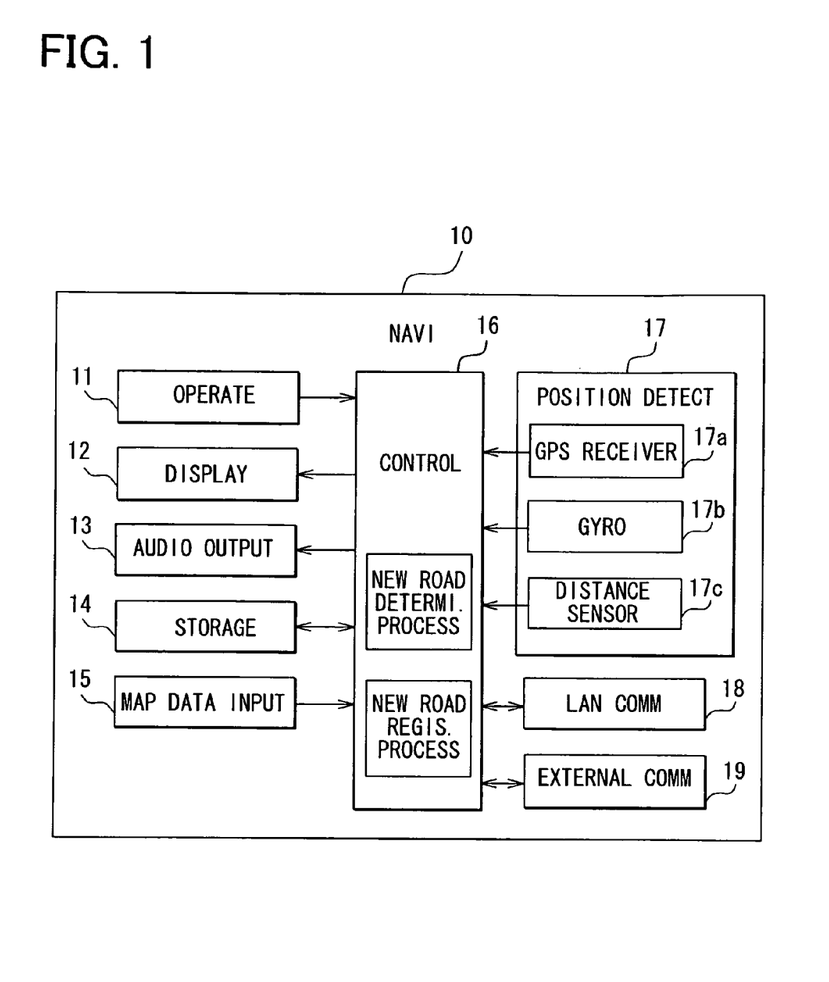
FIG. 1 is a block diagram illustrating a configuration of a navigation apparatus according to an embodiment of the present invention.

FIG. 1 is a block diagram illustrating an overall configuration of a navigation apparatus 10 mounted in a subject vehicle according to an embodiment of the present invention. The navigation apparatus 10 includes an operation section 11, a display section 12, an audio output section 13, a storage section 14, a map data input section 15, a controller as a control circuit 16, a position detection section 17, an in-vehicle LAN communication section 18, and an external communication section 19.

The operation section 11 is to receive the various instructions from a user. For instance, it includes mechanical key switches and/or touch-sensitive switches. The display section 12 is for executing the various displays. For instance, it includes an LCD (Liquid Crystal Display), and an organic electroluminescence.

The audio output section 13 is for outputting sounds based on signals inputted from the control circuit 16. The storage section 14 includes a device (for example, HDD) which does not need record holding operation. For instance, it can store the variety of information.

The map data input section 15 is for inputting the various data of map data or facility retrieval data. The map data are used when executing a route guidance etc., while the facility retrieval data are used when retrieving a predetermined facility, etc. Those data are stored in a storage medium such as a DVD-ROM or HDD due to the requirement of the large data volume.

The control circuit 16 includes a known microcomputer having a CPU, ROM, RAM, I/O, and bus line connecting the foregoing components or the like. The control circuit 16 controls each component or the like of the navigation apparatus 10 according to a program stored in the ROM and a program loaded in the RAM.

The position detection section 17 includes the following sensors or the like: a GPS receiver 17a, which receives via a GPS antenna (not shown) signals from satellites for GPS (Global Positioning System) and is used for detecting a position, orientation, or speed of the vehicle; a gyroscope 17b which detects rotational movement exerted over the vehicle; and a distance sensor 17c which detects a travel distance of the subject vehicle. The individual sensors or the like 17a to 17c have different types of detection errors from each other; therefore, they are used to complement each other.

The in-vehicle LAN communication section 18 is for transmitting and receiving the various information via an in-vehicle LAN (unshown). The external communication section 19 acquires traffic information such as accident information or congestion information from a traffic information center such as VICS (Vehicle Information Communication System) via a light beacon, a radio wave beacon, etc. provided in road sides. In addition, the traffic information transmitted via the FM multiplex broadcast is also acquired.

[Explanation of Operation]

Next, an example of an operation of the navigation apparatus 10 is explained. The control circuit 16 of the navigation apparatus 10 detects a travel locus of the subject vehicle by specifying positions (i.e., present positions) of the subject vehicle using the position detection section 17 periodically with predetermined time intervals during the travel of the subject vehicle. The control circuit 16 detects a non-road region travel locus, which is a travel locus generated when the subject vehicle travels a region excluding roads registered in the map data, which is inputted from the map data input section 15. A route based on the detected non-road region travel locus is stored as a non-road region route in the storage section 14. A new road determination is then made as to whether the non-road region travel locus is a route traveled at the time when the subject vehicle traveled a new road, which is not registered in the map data. When the determination is affirmatively made, the non-road region route is registered as a new road. Based on the non-road region route registered as a new road, the control circuit 16 executes the various processes such as a route guidance process, a map image display process, etc. The following explains a new road determination process at the time when making the determination as to whether the non-road region route is a new route or not.

(1) Non-Road Region Route Determination List

Figure 2A:
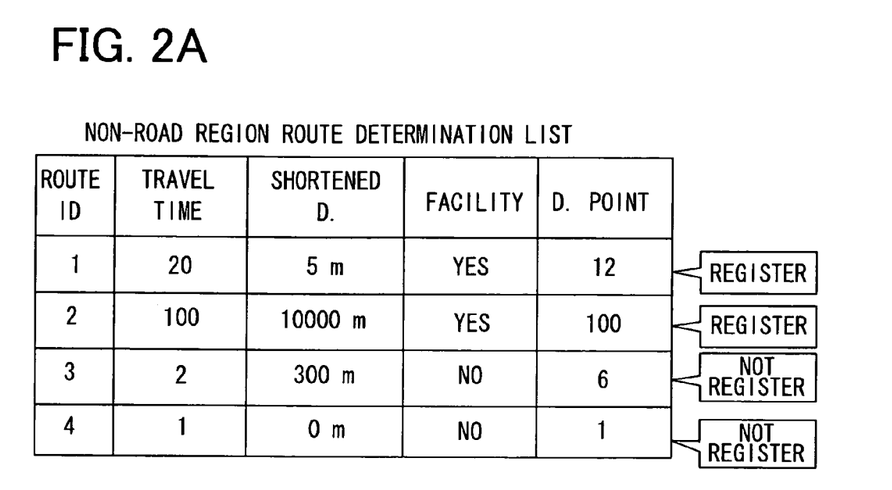
FIG. 2A is a diagram illustrating a non-road region route determination list.

FIG. 2A illustrates a non-road region route determination list, which is used in order to determine whether a non-road region route is a new road (i.e., to perform a new road determination). The non-road region route determination list is stored in the storage section 14. The non-road region route determination list contains several items of "route ID," "travel times," "shortened distance," "facility," and "determination point."

"Route ID" is an item which indicates an ID for specifying a non-road region route stored in the storage section 14. "Travel times" signifying "number of repetition times in travel" is an item which indicates the number of times the subject vehicle traveled the corresponding non-road region route.

"Shortened distance" is an item which indicates a shortened distance by which the travel distance the vehicle travels the corresponding non-road region route is reduced from or compared with the travel distance the vehicle travels roads registered in the map data. Further, in detail, "shortened distance" signifies a difference in the travel distance as a result of subtracting the travel distance alongside of the non-road region route from the travel distance alongside of the roads registered in the map data. It is noted that the travel distance alongside of the non-road region route (called "non-road region travel distance) starts with a start point and ends with an end point whereas the travel distance alongside of the roads registered in the map data (called "map data travel distance) starts with the same start point as the non-road region route and ends with the same end point as the non-road region route. The travel distance alongside of the roads or routes signifies a travel distance undergone or calculated when the vehicle travels while staying on the heading direction of the roads or route.

"Facility" signifying "presence or absence of facility" is an item which indicates whether a predetermined facility registered in the map data exists around the corresponding non-road region route. In detail, "facility" indicates "YES" when the predetermined facility exists within 30 m distant from the corresponding non-road region route, and "NO" when the above facility does not exist within the same. Further, the predetermined facility may be a commercial establishment, amusement facility, etc.

"Determination point" is an item which indicates an accuracy or probability as to whether the corresponding non-road region route is a new route. As mentioned in detail later, the navigation apparatus 10 of the present embodiment determines a degree in accuracy (hereinafter, referred to as "accuracy degree") as to whether to be a new road, with respect to a non-road region route, based on "travel times," "shortened distance," and "facility." "Determination point" is an item which indicates the cumulative result (all multiplication result) of the accuracy degrees corresponding to respective items. When "determination point" is equal to or greater than ten (10), the corresponding non-road region route is registered as a new road.

(2) Accuracy Degree Determination Reference List

As the above mentioned, the navigation apparatus 10 of the present embodiment determines an accuracy degree in that a non-road region route is a route indicating a new road, based on "travel times," "shortened distance," and "facility" in non-road region route determination list. The following explains an accuracy degree determination reference list which indicates a reference used when determining an accuracy degree relative to each item.

Figure 2B:
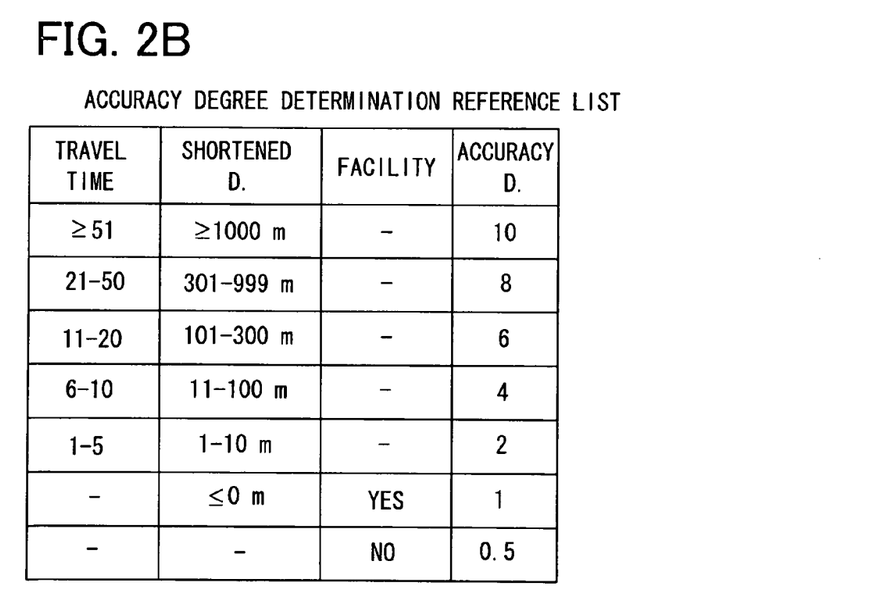
FIG. 2B is a diagram illustrating an accuracy degree determination reference list.

FIG. 2B illustrates an accuracy degree determination reference list. The accuracy degree determination reference list is stored in the storage section 14. The accuracy degree determination reference list contains (i) three items of "travel times," "shortened distance," and "facility," and (ii) "accuracy degree."

"Travel times" signifying "number of repetition times in travel" is an item which indicates the number of times the subject vehicle traveled a non-road region route. Further, "shortened distance" is an item which indicates a shortened distance by which the travel distance the vehicle travels a non-road region route (i.e., non-road region travel distance) is reduced from or compared with the travel distance the vehicle travels roads registered in the map data (map data travel distance). Further, in more detail, "shortened distance" signifies a difference in the travel distance as a result of subtracting the travel distance alongside of the non-road region route from the travel distance alongside of the roads registered in the map data. It is noted that the travel distance alongside of the non-road region route starts with a start point and ends with an end point whereas the travel distance alongside of the roads registered in the map data starts with the same start point as the non-road region route and ends with the same end point as the non-road region route.

Further, "facility" signifying "presence or absence of facility" is an item which indicates whether a predetermined facility registered in the map data exists around the corresponding non-road region route. As explained above, the accuracy degree is a degree of the accuracy in that a non-road region route is a new road. The item of the "accuracy degree" in the accuracy degree determination reference list indicates a degree based on each of "travel times," "shortened distance," and "facility."

For instance, in the accuracy degree determination reference list, "travel times" includes "21 to 50" times, "11 to 20" times, "6 to 10" times, and "1 to 15" times; corresponding "accuracy degree" includes "10," "8," "6," "4," and "2," respectively.

In addition, in the accuracy degree determination reference list, "shortened distance" includes ">=1000 m," "301-999 m," "101-300 m," "11-100 m," "1-10 m," and "<=0 m"; corresponding "accuracy degree" includes "10," "8," "6," "4," "2," and "1," respectively.

In addition, in the accuracy degree determination reference list, "facility" includes "YES" and "NO"; "accuracy degree" corresponding to "YES" is one (1), and "accuracy degree" corresponding to "NO" is 0.5, respectively.

(3) Examples of Determining Accuracy Degree

The following explains a method for determining an accuracy degree as to whether a non-road region route is a new road based on the accuracy degree determination reference list indicated in FIG. 2B using an example of the non-road region route having a route ID of "1" in the non-road region route determination list of FIG. 2A.

In the accuracy degree determination reference list, the non-road region route with the route ID of "1" corresponds to "travel times" of "20" times, "shortened distance" of "5 m," and "facility" of "YES." Thus, the accuracy degree based on "travel times" is "6," the accuracy degree based on "shortened distance" is "2," and the accuracy degree based on "facility" is "1." The multiplication result of the accuracy degrees becomes 12 (=6×2×1); thereby, "determination point" about the non-road region route with ID of "1" is "12."

(4) New Road Registration Process

Figure 3:
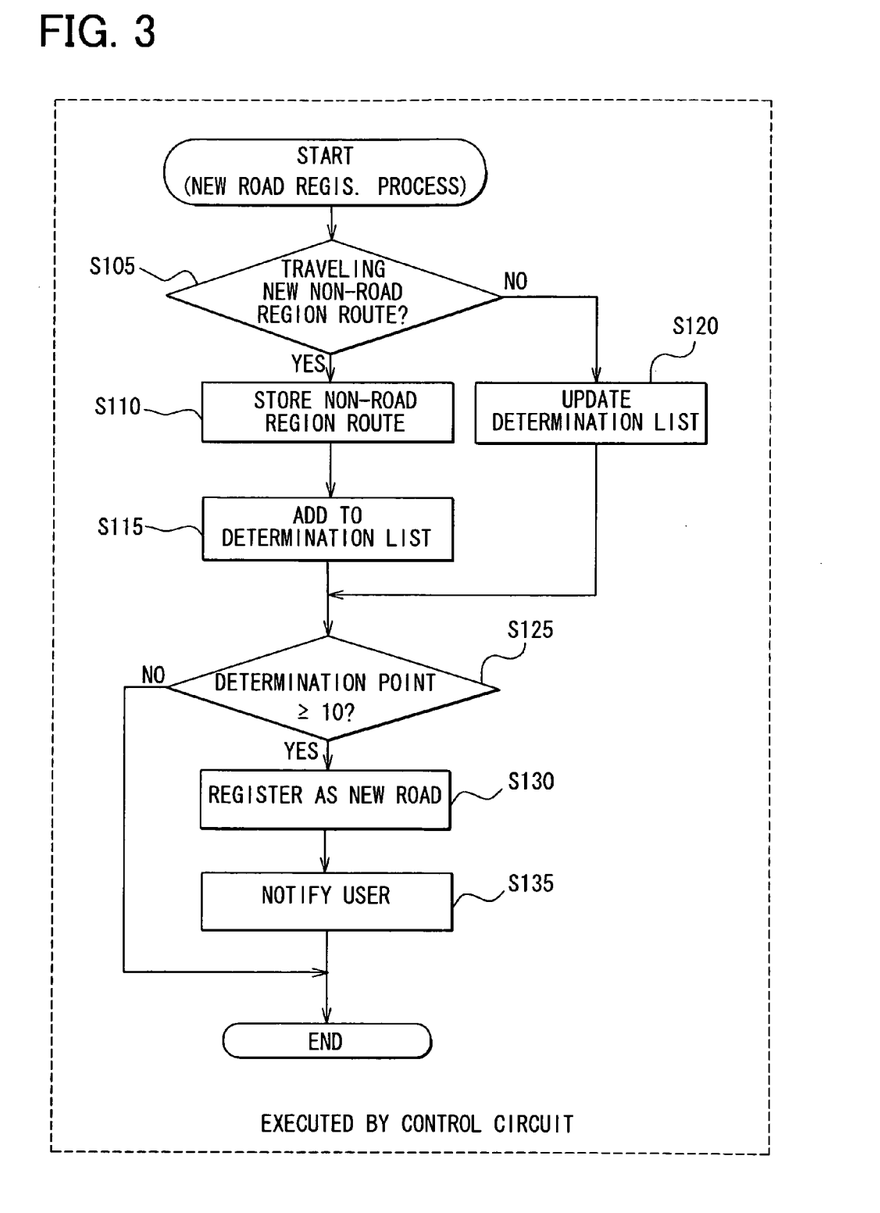
FIG. 3 is a flowchart illustrating a new road registration process.

The following explains a new road registration process using a flowchart in FIG. 3. The new road registration process is to execute a determination as to whether a detected non-road region route is a new road, and registers a new road when the determination is affirmatively executed. The present process is executed when the subject vehicle ends the travel in the non-road region.

As mentioned above, the control circuit 16 of the navigation apparatus 10 specifies a position, where the subject vehicle is located (i.e., present position of the subject vehicle), during a travel using the position detection section 17 periodically, thus detecting a travel locus of the subject vehicle. In S105, the control circuit 16 specifies a non-road region travel locus within a non-road region, where the vehicle ran immediately before, and determines whether the specified non-road region travel locus is a new non-road region travel locus, which has not been stored in the storage section 14. When the subject vehicle runs a new non-road region route (S105: Yes), the control circuit 16 advances the processing to S110. When the subject vehicle runs the non-road region route, which has been stored in the storage section 14 (S105: No), the control circuit 16 advances the processing to S120.

In S110, the control circuit 16 stores the detected non-road region travel locus in the storage section 14 as a new non-road region route. For instance, while configuration points are extracted from the non-road region travel locus using a well-known method, two node IDs are specified among the roads registered in the map data. The first node ID is a road ID assigned to the road intersecting with the start point of the non-road region travel locus. The second node ID is a road ID assigned to the road intersecting with the end point of the non-road region travel locus. The extracted configuration points and specified node IDs are stored in the storage section 14 to thereby store the detected non-road region travel locus as a new non-road region route. The control circuit 16 then advances the processing to S115.

In S115, the control circuit 16 adds a new record, which corresponds to the new non-road region route, to the non-road region route determination list. For instance, while an unused route ID is assigned as a "route ID" in the new record, "travel times" is assigned with "1." In addition, a non-road region travel distance, which is a distance alongside of the new non-road region route from its start point to its end point, is specified. A shortest (map data) route traveling roads registered in the map data from the start point to the end point of the new non-road region route is specified; then, a map data travel distance, which is a distance alongside of the specified shortest route included in the map data, is specified. The non-road region travel distance, which is alongside of the non-road region route, is subtracted from the map data travel distance, which is alongside of the shortest route included in the map data, to thereby obtain a "shortened distance." In addition, based on the map data, the presence or absence of a predetermined facility, for instance, within 30-m region from the new non-road region route, is determined. The determination result is assigned to "facility," as "YES" or "NO." The control circuit 16 then determines an accuracy degree as to whether the new non-road region route is a new road, with respect to each of "travel times," "shortened distance," and "facility," with reference to the accuracy degree determination reference list. The multiplication result of the respective accuracy degrees is assigned to "determination point." The control circuit 16 then advances the processing to S125.

In S120 performed when the subject vehicle runs the non-road region route, which is stored in the storage section 14, the control circuit 16 updates the record, which corresponds to the non-road region route the subject vehicle ran, in the non-road region route determination list stored in the storage section 14. For instance, "route ID" of the traveled non-road region route is specified in the non-road region route determination list, and "travel times" corresponding to the specified "route ID" is updated by being incremented by one. The accuracy degree as to whether the non-road region route is a new road is determined with respect to each of "travel times," "shortened distance," and "facility" based on the accuracy degree determination reference list and the respective accuracy degrees are multiplied with one another as a multiplication result of "determination point." The control circuit 16 then advances the processing to S125.

In S125, the control circuit 16 determines whether "determination point" is equal to or greater than 10. The "determination point" is either in the record newly added to the non-road region route determination list in S115, or in the record updated in S120. When the "determination point" is equal to or greater than ten, the non-road region route specified by the "route ID" in the corresponding record is stored as a new road in the storage section 14, thereby registering the non-road region route as a new road (S130). The control circuit 16 then notifies the user of a message indicating that the non-road region route is registered as a new road via the display section 12 or the audio output section 13 (S135). The present process is then ended. In addition, when the "determination point" is less than ten, the control circuit 16 ends the present process.

[Effect]

When the subject vehicle frequently travels a non-road region route detected by the navigation apparatus 10 of the present embodiment, the non-road region route is supposed to be a route containing existing roads actually traveled by the subject vehicle with a high accuracy degree. Then, the navigation apparatus 10 specifies the number of times the subject vehicle ran the non-road region route; thus, based on the specified number of times, the accuracy degree of the non-road region route being a new road is determined. Therefore, the navigation apparatus 10 can determine appropriately the accuracy degree of the non-road region route being a new road.

In addition, for'example, by traveling a non-road region route, a travel distance to reach a predetermined point may be shortened compared when traveling roads registered in the map data; in other words, the non-road region route may be is a shorter route. In such a case, the non-road region route can be regarded as being highly useful. Therefore, the non-road region route is estimated, with a high probability, to be a route the user intentionally selected as a travel route instead of a route based on the travel locus detected accidentally because of measurement errors etc. To that end, the navigation apparatus 10 operates as follows. A shortest route composed of roads in a map indicated by map data is specified which connects the start point and end point of the non-road region route. Then, a map data travel distance, which is alongside of the specified shortest route included in the map data, is calculated. A non-road region travel distance, which is alongside of the non-road region route from the start point to the end point, is calculated. The non-road region travel distance, which is alongside of the non-road region route, is subtracted from the map data travel distance, which is alongside of the shortest route included in the map data, to thereby obtain a difference in travel distance. Based on the calculated subtraction result, the accuracy degree of the non-road region route being a new road is determined. Therefore, the navigation apparatus 10 can determine appropriately the accuracy degree of the non-road region route being a new road.

Further, when a non-road region route is a route to a predetermined facility, the possibility that the non-road region route is existent is high. Thus, the navigation apparatus 10 determines whether a predetermined facility registered in the map data exists around the non-road region route. Based on the determination result, the accuracy degree of the non-road region route being a new road is determined. Therefore, the navigation apparatus 10 can determine appropriately the accuracy degree of the non-road region route being a new road.

The navigation apparatus 10 is determines whether the non-road region route is a new road based on the multiplication result of respective accuracy degrees acquired by the three different methods (S125). The navigation apparatus 10 then executes a route guidance process, a map image display process, etc. based on the map data and the non-road region route determined to be a new road. Thus, whether the non-road region route is a new road can be determined. The navigation apparatus 10 can thus determine whether the non-road region route is a new road without inclining towards a specific aspect or method. The appropriate determination about a new road can be enabled. This helps prevent a process such as a route guidance process from being mistakenly executed based on a road which does not exist really.

OTHER EMBODIMENTS (1) The navigation apparatus 10 of the present embodiment determines an accuracy degree in that a non-road region route is a new road, based on each of three items of "travel times," "shortened distance," and "facility." Then, based on the three accuracy degrees acquired as a determination result, it is determined whether the non-road region route is a new road. In this regard, however, the navigation apparatus 10 may determine accuracy degrees with respect to any two items in the above three items. Then, based on the two accuracy degrees acquired as a determination result, it may be determined whether the non-road region route is a new road. Further, the navigation apparatus 10 may determine an accuracy degree with respect to any one of the above three items. Then, based on the single accuracy degree acquired as a determination result, it may be determined whether the non-road region route is a new road. Even if such a configuration is provided, it may be determined whether the non-road region route is a new road.

(2) The present embodiment explained an in-vehicle navigation apparatus which determines whether the detected non-road region route is a new road and executes a process based on the non-road region route which is determined to be a new road. However, the present invention is applicable not only to the in-vehicle navigation apparatus. For example, the same configuration as that of the navigation apparatus 10 of the present embodiment can be provided to a portable apparatus such as a cellular phone which acquires map data from an external server and has a navigation function based on the acquired map data. By having such a configuration, the above portable apparatus can appropriately determine whether the detected non-road region route is a new road. A predetermined process such as a route guidance process or a map image display process is executed based on the non-road region route determined to be a new road. This helps prevent a process from being mistakenly executed based on a road which does not exist really.

(3) The navigation apparatus 10 of the present embodiment reads the map data stored in a storage medium, such as HDD, via the map data input section 15 and executes a route guidance process etc. based on the read map data. In contrast, the navigation apparatus 10 can update the map data stored in the HDD etc. based on the non-road region route determined as being a new road. Having such a configuration can prevent the map data stored in the HDD etc. from being updated based on the non-road region route which indicates a road nonexistent really. The map data stored in HDD etc. can be thus updated appropriately.

(Functions)

The navigation apparatus 10 may functions as a data processing apparatus. The control circuit 16 included in the navigation apparatus 10 may function as a route storage control means or section, a repetition specification means or section, a new road determination means or section, a process execution means or section, a map data route specification means or section, a facility determination means or section, a travel-times (or first) determination information specification means or section, a shortened-distance (or second) determination information specification means or section, or a facility-presence (or third) determination information specification means or section. In addition, the control circuit 16 may function as a travel locus specification means or section using the position detection section 17. In addition, the storage section 14 may function as a route storage means or section, and the map data input section 15 may function as an acquisition means or section.

Further, a shortest route, which is composed of roads in a map indicated by the map data and connects a start point and end point of a non-road region route, may function as another existing map data route. In addition, the travel times or the number of times the subject vehicle ran a certain non-road region route may function as a first determination information. Further, (i) a map data travel distance alongside of a shortest route, which is composed of roads in a map indicated by map data while connecting between a start point and end point of a non-road region route, and (ii) a non-road region travel distance alongside of a non-road region route between the start point and the end point may function as a second determination information. In addition, a determination result of whether a predetermined facility registered in the map data exists around a non-road region route may function as a third determination information.

Each or any combination of processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A data processing apparatus to travel, the apparatus comprising:

an acquisition section configured to acquire map data;

a route storage section configured to store a route in a map indicated by the acquired map data;

a travel locus specification section configured to specify a travel locus, which is generated when traveling, in a map indicated by the acquired map data;

a route storage control section configured to (i) cause the travel locus specification section to specify a non-road region travel locus generated when traveling a non-road region being a region excluding roads included in a map indicated by the acquired map data, and (ii) store in the route storage section a non-road region route, which corresponds to the specified non-road region travel locus;

a new road determination section configured to perform a new road determination, which determines whether the non-road region route stored in the route storage section is a route indicating a new road being a road, which has not been registered in the map data;

a process execution section configured to execute a predetermined process based on the non-road region route, which is determined to be the route indicating the new road; and at least two accuracy degree specification sections of a first accuracy degree specification section, a second accuracy degree specification section, and a third accuracy degree specification section, the first accuracy degree specification section being configured to specify repetition times the non-road region route stored in the route storage section has been traveled, the repetition times being specified based on a travel locus specified by the travel locus specification section, and specify an accuracy degree, which is a degree in an accuracy as to whether the non-road region route is a route indicating the new road, based on the repetition times, the second accuracy degree specification section being configured to specify a previously existing map data route relative to the non-road region route, in roads included in a map indicated by the map data acquired by the acquisition section, the previously existing map data route linking between a start point and an end point of the non-road region route stored in the route storage section, and specify an accuracy degree, which is a degree in an accuracy as to whether the non-road region route is a route indicating the new road, based on (i) a non-road travel distance, which is calculated alongside of the non-road region route stored in the route storage section from a start point to an end point, and (ii) a map data travel distance, which is calculated alongside of the previously existing map data route relative to the non-road region route, the third accuracy degree section being configured to determine, based on the acquired map data, a presence or an absence of a predetermined facility in a vicinity of the non-road region route stored in the route storage section, and specify an accuracy degree, which is a degree in an accuracy as to whether the non-road region route is a route indicating the new road, based on a determination result of determining the presence or the absence of the predetermined facility, wherein the new road determination section is further configured to perform the new road determination, with respect to the non-road region route stored in the route storage section, based on the accuracy degrees specified by the at least two accuracy degree specification sections.

2. The data processing apparatus according to claim 1, wherein the new road determination section is further configured to perform the new road determination, with respect to the non-road region route stored in the route storage section, based on a cumulative result of the accuracy degrees specified by the at least two accuracy degree specification sections.

* * * * *